April 22, 1941.  R. W. GILBERT  2,239,363
INTEGRATING APPARATUS
Filed July 15, 1939  2 Sheets-Sheet 1

April 22, 1941.  R. W. GILBERT  2,239,363
INTEGRATING APPARATUS
Filed July 15, 1939   2 Sheets-Sheet 2

Inventor:
Roswell W. Gilbert,
By Poster, Pierce & Scheffler
Attorneys.

Patented Apr. 22, 1941

2,239,363

UNITED STATES PATENT OFFICE 2,239,363

INTEGRATING APPARATUS

Roswell Ward Gilbert, East Orange, N. J., assignor to Weston Electrical Instrument Corporation, Newark, N. J., a corporation of New Jersey Application July 15, 1939, Serial No. 284,805

10 Claims. (Cl. 88—23)

This invention relates to integrating apparatus and more particularly to apparatus for integrating light values against time.

Many photometric applications, such as exposure timing in photo-engraving and other photographic reproduction processes, should be controlled in accordance with true integrated units such as foot-candle-seconds as the light source is usually subject to rapid changes in intensity, for example when carbon arcs, mercury vapor lamps and other variable intensity devices provide light for relatively long exposures of the light-sensitive medium. The computation of a time interval from the measured light intensity at any one instant leads to erroneous results and proposals have been made to integrate the fluctuating illumination value over a time interval by means of a saturated vacuum type phototube operating into a condenser to perform the integration, and a thermionic tube relay that returned the condenser to its original condition when the condenser charge rose or fell to a predetermined voltage level, thus starting a new cycle. Unfortunately, however, the vacuum type phototube is not sufficiently stable to insure a reasonable degree of accuracy or uniformity in operation, and complex and expensive voltage regulating circuits are required as the integrating condenser must be operated over a definitely and accurately maintained voltage range.

It is not possible to take advantage of the stable characteristics and the linear response of the barrier layer type of photocell by substituting such a cell in the prior phototube and condenser types of integrating circuits as the barrier layer type of photocell exhibits its best characteristics when the terminal voltage is kept to a minimum, i. e. when working into a circuit of relatively low resistance. The condenser type of integrator requires a considerable voltage change to operate satisfactorily the thermionic relay, and this condition cannot be satisfied by a barrier layer type of photocell that is essentially a current-change device.

An object of the present invention is to provide apparatus for integrating against time any variable function that may be measured by an electrical measuring instrument. An object is to provide an integrating photometer including a barrier layer type of photocell and a current integrating device that does not place a substantial voltage load upon the photocell. An object is to provide an integrating photometer including a barrier layer type of photocell, a movable current-responsive device that is connected electrically to the photocell and displaced at a speed determined by the current output of the photocell, a switching system controlled by the displacement of the current-responsive device to reverse the direction of movement of the current-responsive device upon the accumulation of a preselected light value-time unit, and a counter for registering the number of cycles of displacement of current-responsive devices. Other objects are to provide an integrating photometer including a photo-electric converter or cell, a pivotally mounted coil connected across said cell and movable angularly in a magnetic field at a speed determined by the current output of the cell, relay mechanism for reversing the connections between the cell and the movable coil upon a predetermined angular movement of the coil, and mechanisms responsive to repeated cycles of movement of the pivotally mounted coil in opposite directions to actuate a counter and/or a switch system for rendering the light source inoperative or, alternatively, for energizing an alarm.

These and other objects and advantages of the invention will be apparent from a consideration of the following specification when taken with the accompanying drawings in which.

Figure 1:
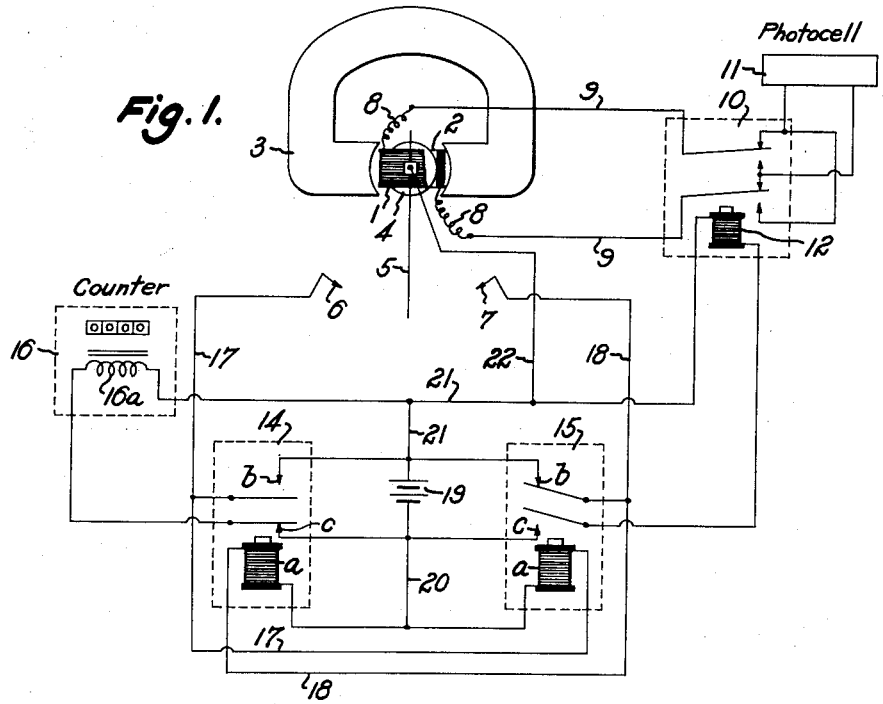
Fig. 1 is a circuit diagram of an embodiment of the invention.
Figure 2:
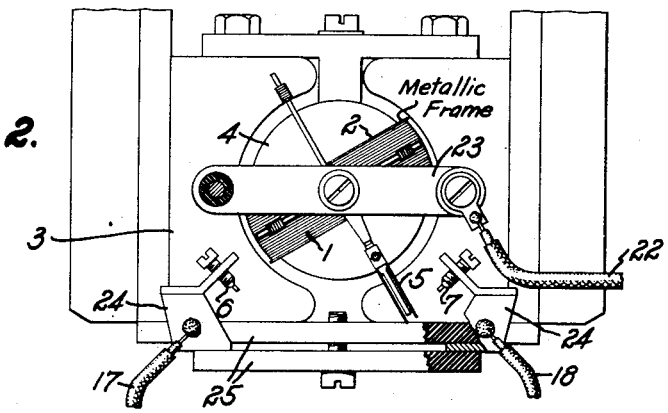
Fig. 2 is a fragmentary plan view of the integrating mechanism.

The novel integrating mechanism is generally similar to a microammeter of the pivoted coil, permanent magnet type. As shown in Figs. 1 and 2, the coil 1 is wound on a metal frame 2 and is supported by the usual jewel bearings, not shown, for pivotal movement in the gaps between the polar surfaces of the permanent magnet 3 and the core 4. The moving coil carries a contact arm 5 and displaces the same between two relatively stationary contacts 6, 7 that limit the oscillatory motion of the coil.

Current connections to the coil 1 are made through fine coiled filaments 8, 8 that impose substantially no torque load on the moving systems. Leads 9 extend from the filaments 8 to the moving blades of a polarity reversing switch 10 to which the photocell 11 of the barrier layer type is connected. The switch 10 is of the electromagnetic type and includes a solenoid 12 for operating the blades in one direction against the action of a restoring spring, not shown.

A pair of interlocking relays 14, 15 are controlled by the contact system of the integrating mechanism and, in turn, control the energization of a counter 16 and the polarity reversing switch 10. Each relay includes a solenoid a, and two sets of alternatively closed contacts b, c. Lead 17 extends from the contact 6 of the integrating device to the blade of the interlocking contacts b of relay 14 and to the solenoid a of relay 15. Similarly, lead 18 extends from contact 7 to the blade of the interlocking contacts b of relay 15 and solenoid a of relay 14. A lead 20 from one terminal of a current source 19 is connected to the fixed contacts of the sets c of both relays, and both solenoids a are returned to the same lead. The blade contact of set c of relay 14 is connected to the solenoid 16a of the counter 16, and the blade of set c of relay 15 is connected to the solenoid 12 of the polarity reversing switch or relay 10. Solenoids 12 and 16a are both returned to the other terminal lead 21 of the current source, and the contact arm 5 of the integrating device is connected to lead 21 by a jumper 22. The relay circuits are completed by connections from the fixed contact of both sets b to the lead 21.

As shown in Fig. 2, the contact arm 5 is preferably of the type described and claimed in Patent No. 1,879,349, Karl M. Lederer, and the circuit connection to contact arm is made through the bridge 23 that is supported on and insulated from the magnetic system. The contacts 6, 7 are mounted on brackets 24 of approximately Z-shape that have legs extending between clamping strips 25 of insulating material. The brackets may be adjusted towards or away from each other to determine the angle of oscillation of the coil 1.

The current output of the barrier layer photocell 11 is a linear function of the illumination at the cell and the moving coil 1 is displaced by the photocell current at that angular velocity at which the torque due to the current through the coil is exactly equal to the reaction torque of the induced current in the metal coil frame 2. The direction of travel of the coil 1 is automatically reversed by relays 14, 15 as the contact arm 5 strikes the contacts 6, 7, in alternation, and the total travel of the coil is registered by the counter 16 in terms of cycles of oscillatory travel. The interlocking contacts of the relays 14, 15 operate in the usual manner to restrict actuation of the relay systems to the alternate engagement of contact arm 5 with contacts 6, 7. The total travel of the coil is a measure of the integrated light values and the apparatus may be adjusted to read directly and accurately in any desired units, for example foot-candle-seconds, by proper selection of the moving coil constants and adjustment of the angle of oscillation of the coil in accordance with the sensitivity of the particular photocell.

The limiting factors as to the accuracy of the summation are friction in the jewels and pivots of the moving coil at low current values and the operating time of the relays at high current values where operation is very rapid and the relay contacting time becomes appreciable in comparison with the time of one cycle of oscillation of the moving coil. The range of current values of accurate or substantially accurate operation is sufficient for most practical purposes as a typical experimental device exhibited an error of one percent at a low value of 12 microamperes and at a high value of 380 microamperes; these current values corresponding to about 8 and 244 foot-candles respectively at the photocell.

Figure 3:
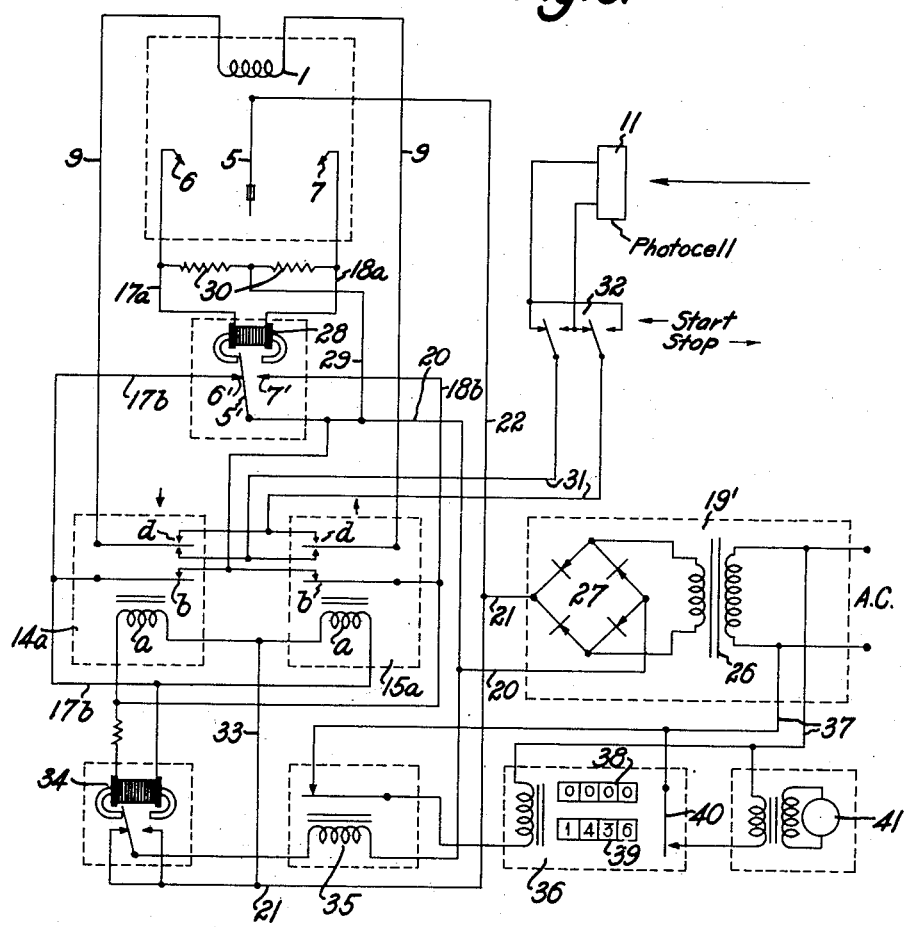
Fig. 3 is a circuit diagram of another embodiment of the invention.

The circuit of Fig. 3 operates in the same general manner as the Fig. 1 circuit but includes additional circuit elements that permit operation from the usual 60 cycles power circuit and provide a predetermined integration to a selected value. The current source 19' for energizing the apparatus includes a step-down transformer 26 and rectifier bridge 27 for supplying direct current to leads 20, 21 for actuating the relays. A polarized relay 28 is arranged between the integrator movement and the relays to avoid overloading of the movement contacts. The contact arm 5 is connected to lead 21 by the jumper 22, and the other current source lead 20 is connected by jumper 29 to the center point of resistors 30 that are in parallel with the relay 28 between the leads 17', 18' from contacts 6, 7, respectively. Contact arm 5' of the polarized relay 28 is normally held against contact 6' and is moved to engage contact 7' when the integrating movement contact arm 5 engages the contact 7.

The relays 14a, 15a have each a set of contacts b for interlocking and a double set of contacts d for reversing the polarity of the photocell current supplied to the coil 1. The blades of contacts d are connected to the coil 1 by leads 9, and the several contacts of the sets d are connected by leads 31 and a manually operable polarity reversing switch 32 to the photocell 11. As indicated by the legend "Start Stop" and the arrows, the polarity of the input current flow in leads 31 may be such that the polarity reversals at relay contacts d maintain the oscillating travel of the coil 1 as its contact arm 5 engages contacts 6, 7, or it may be such that the coil 1 is stalled with contact arm 5 against one of the contacts. Lead 17b connects the contact 6' of polarized relay 28 to the holding contact blade of relay 14a and the solenoid a of relay 15a, and lead 18b connects contact 7' to the holding contact blade of relay 15a and the solenoid of relay 14a. A common return lead 33 connects both solenoids to the current source lead 21.

A sensitive polarized voltage relay 34 is employed to assure an impulse to the counter mechanism that is independent of the length of the cycle of operation of the integrating movement. The relay 34 is connected between the leads 17b, 18b, and has a contact arm that is connected through a power relay 35 to the current source lead 20 and a pair of spaced contacts that are both connected to the current source lead 21. Power relay 35 has contacts that close, when the relay is deenergized, to complete a circuit through the solenoid of a "predetermining counter" 36 and leads 37 that are connected to the high voltage input side of transformer 26. The predetermining type of counter includes numeral wheels 38 on which the counting is registered by the successive current pulses to the solenoid, a second set of numeral wheels 39 that may be adjusted manually to a desired value, and a switch 40 that is closed when the value registered in wheels 38 reaches the value set on the wheels 39. Switch 40 controls the energization of an alarm or shutter operating mechanism 41.

The apparatus is inoperative when switch 32 is adjusted to its "stop" position in which the polarity of the current supply to the integrating movement is such that the contact arm 5 remains in engagement with contact 6 or 7. The counter 39 is set to a desired value, the light source is then energized and, simultaneously with the opening of the shutter of the photographic apparatus, the switch 32 is thrown to "start" position, as shown in Fig. 3. The integrating action takes place substantially as previously described with reference to the Fig. 1 circuit and, when the number registered on counter 38 equals the number set on counter 39, the switch 40 is closed to actuate the alarm or control device 41.

Figure 4:
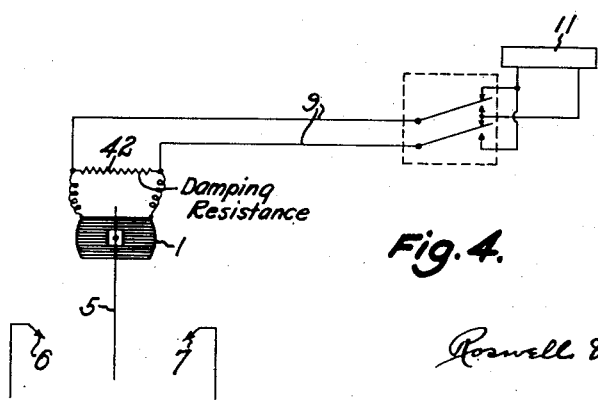
Fig. 4 is a fragmentary circuit diagram of another arrangement for obtaining an angular displacement of the integrating movement as a linear function of the light intensity at the photocell.

As shown in Fig. 4, the rate of displacement of the coil 1 may be determined by a resistance 42 in place of the metal coil frame 2 that is shown in Figs. 1 and 2. The coil 1 revolves at that velocity at which its induced E. M. F. is equal to the voltage drop across resistor 42 due to the cell current. The velocity is thus determined by an E. M. F. balance between the moving coil and the shunt resistance rather than a torque balance between the moving coil and the metal frame.

It is to be understood that the invention is not limited to integrating apparatus in which the current flow to the moving coil is a function of light values, or to the particular relay circuits for obtaining a reversal of the polarity of the current supply to the moving coil and for operating the registering mechanism.

I claim:

1. In an integrating photometer, the combination with an integrating system comprising a coil and means mounting the same for movement in opposite directions in a magnetic field, of a photoelectric cell, circuit elements including polarity reversing means connecting said cell to said coil, relay means controlled by displacement of said coil to predetermined end positions to actuate said polarity reversing means to reverse the direction of current flow in said coil, thereby to reverse the direction of movement thereof, and means including a power source separate from said photocell for registering the number of cycles of movement of said coil.

2. In an integrating photometer, the invention as claimed in claim 1, wherein said registering means includes a switch, and means for operating said switch upon the registration of a preselected light-time value.

3. Integrating apparatus comprising means for producing a current that fluctuates with variations in the value of a preselected factor, a coil and means supporting the same for pivotal oscillatory movement in a magnetic field, circuit connections including a polarity reversing switch between said current producing means and said coil, relay means including a pair of relatively stationary contacts forming stops to limit oscillatory movement of said coil for actuating said polarity reversing means upon arrival of the coil at either of two predetermined limits of oscillatory movement, and means for registering the number of oscillations of said coil.

4. Integrating apparatus as claimed in claim 3, wherein said relay means includes a contact arm carried by said coil and movable thereby between said pair of relatively stationary contacts, and means mounting said contacts for adjustment to control the length of the path of oscillatory movement of said coil.

5. In an integrating photometer, a barrier layer type photocell, a coil and means supporting the same for pivotal movement in a magnetic field, circuit elements including polarity reversing switch means connecting said photocell to said coil, a contact arm carried by said coil, a pair of spaced relatively stationary contacts between which said contact arm is moved by said coil, relay means controlled by said contact arm and contacts for actuating said switch means to reverse the polarity of the connections between the photocell and coil upon engagement of the contact arm with the respective contacts, and means for registering the number of cycles of oscillations of said coil.

6. In an integrating photometer, the invention as claimed in claim 5, wherein said registering means includes switch means operable upon the registration of a preselected number of cycles.

7. In an integrating photometer, the invention as claimed in claim 5, wherein said circuit elements include a manually operable polarity reversing switch in series with said polarity reversing switch means, whereby the manual adjustment of said switch renders said polarity reversing switch means operative or alternatively inoperative to supply to the coil current of such polarity as to maintain oscillation of the coil.

8. An integrating photometer comprising a coil and means supporting the same for free angular oscillation in the gap between the polar surfaces of a permanent magnet, a photoelectric cell of the barrier layer type, relay means operable by said coil upon reaching preselected oscillation limits to reverse the polarity of the current delivered to said coil by said cell, thereby to reverse the direction of travel of the coil; said relay means comprising a pair of alternatively energized relays, switch means actuated upon energization of one relay to reverse the polarity of the current delivered to the coil, means for registering the number of cycles of oscillation of the coil, and switch means actuated upon energization of the second relay to deenergize the first relay and to energize said registering means.

9. An integrating photometer comprising a photocell, an integrating instrument including a coil pivotally mounted for oscillation in the gap between the poles of a permanent magnet, and a contact arm carried by said coil for cooperation with angularly spaced contacts; an auxiliary relay including a contact arm displaceable between spaced contacts in accordance with the engagement of the integrating instrument contact arm with its respective contacts; a pair of relays selectively energized by said auxiliary relay in accordance with the engagement of its contact arm with the cooperating contacts; circuit elements including polarity reversing switches actuated by the relays of said pair for connecting said photocell to said coil, a polarized relay controlled by said auxiliary relay and having contacts that close upon the engagement of the auxiliary relay contact arm with either of its contacts, and a counter mechanism controlled by said polarized relay.

10. Integrating apparatus of the type including a coil pivotally supported for free oscillation in a magnetic field, connections including a polarity reversing switch between said coil and a current source that varies in magnitude with a factor to be integrated against time, spaced stops limiting the oscillatory movement of said coil, and means for indicating the number of oscillations of said coil, characterized by the fact that said spaced stops comprise contacts cooperating with a contact arm carried by said coil, and said connections include a relay controlled by said contact arm and contacts actuating the polarity reversing switch.

ROSWELL WARD GILBERT.

CERTIFICATE OF CORRECTION.

Patent No. 2,239,363. April 22, 1941.

ROSWELL WARD GILBERT.

It is hereby certified that error appears in the printed specification of the above numbered patent requiring correction as follows: Page 3, first column, line 42, claim 5, strike out the word "pivotal"; and that the said Letters Patent should be read with this correction therein that the same may conform to the record of the case in the Patent Office.

Signed and sealed this 20th day of May, A. D. 1941.

(Seal)

Henry Van Arsdale,
Acting Commissioner of Patents.